United States Patent [19]
Shibata

[11] Patent Number: 6,111,689
[45] Date of Patent: Aug. 29, 2000

[54] OPTICAL COMPONENT, ZINC SULFIDE SINTERED COMPACT, AND FABRICATING METHOD THEREOF

[75] Inventor: Kenichiro Shibata, Itami, Japan

[73] Assignee: Sumitomo Electric Industries, Ltd., Osaka, Japan

[21] Appl. No.: 09/289,718

[22] Filed: Apr. 12, 1999

[30] Foreign Application Priority Data

Apr. 14, 1998 [JP] Japan ................. 10-102313

[51] Int. Cl.[7] ............ G02B 13/14; G02B 1/00; B29D 11/00
[52] U.S. Cl. .............. 359/356; 264/1.21
[58] Field of Search ............ 359/356, 355, 359/350; 264/1.21

[56] References Cited

U.S. PATENT DOCUMENTS 5,575,959  11/1996  Harris et al. ............ 264/1.21

FOREIGN PATENT DOCUMENTS 1235040  7/1991  Germany .
41-412   1/1941  Japan .
50-2006  1/1975  Japan .
1-55213  11/1989 Japan .

OTHER PUBLICATIONS

"Charaterization of Pore Size Distribution by Infred Scattering in Highly Dense ZnS", by chen, et al., Journal of the American Ceramic Society, Aug. 1993, vol. 76, No. 8.

*Primary Examiner*—Jon Henry
*Attorney, Agent, or Firm*—McDermott, Will & Emery

[57] ABSTRACT

Zinc sulfide and an optical component are provided that significantly reduces transmission for visible light and infrared rays of not more than 3 μm in wavelength, having high transmittance for infrared rays in the wavelength range of 8–12 μm, and that shields visible light. The optical component is constituted by a polycrystalline zinc sulfide sintered compact formed by hot compression molding fine zinc sulfide powder of high impurity at the temperature of 900–1000° C. and the pressure of 150–800 kg/cm². The light transmittance at the region where the thickness is 2 mm is 0% to 3% at the wavelength range of visible light, 0% to 20% at the wavelength range of 2.5–3 μm, 30% to 75% at the wavelength range of 8–12 μm, and 50% to 90% at the same wavelength range with the formation of antireflection coating film.

16 Claims, 5 Drawing Sheets

OPTICAL COMPONENT, ZINC SULFIDE SINTERED COMPACT, AND FABRICATING METHOD THEREOF

BACKGROUND OF THE INVENTION

1. Field of the Invention

The present invention relates to optical components. The present invention relates to an optical component that shields visible light, particularly used in the infrared optical system of an infrared application apparatus such as an infrared sensor, an infrared thermal image processor, and an infrared laser, a zinc sulfide sintered compact, and a method of fabricating the same.

2. Description of the Related Art

The development of a new and highly functional device taking advantage of the superior feature of the infrared ray is now in progress. As to the applications adapting the sensing function, security systems utilizing body sensors, surface thermometers measuring the surface temperature of an object in a non-contact manner, resource probe systems identifying the resource distribution of earth from high above, devices detecting an object in the dark field, and gas analysis devices can be enumerated. Also, infrared thermal image processors for processing collected data by the above devices, high power laser processors utilizing the heat energy of infrared rays are known.

In accordance with the development of such new high functional infrared application apparatuses, the demands placed on higher practical features and lower cost have become critical for the components directed to optical functions used in respective apparatuses such as the window member, the lens member and the like.

As to these optical components, the conventional single crystal germanium (Ge), polycrystals of zinc selenide (ZnSe) and zinc sulfide (ZnS) by chemical vapor deposition (CVD), and infrared transmissive glass including arsenic (As) and serene (Se) are known as the optical materials accommodating the wavelength range of 8–12 $\mu$m. Development for practical use is now in progress on the basis of the superior infrared transmitting properties.

Ge is extremely expensive due to its limitation in resource. ZnS and ZnSe produced by CVD have problems with respect to the environment and production since toxic gas is used during the production stage and that the deposition rate from vapor is low. It is difficult to reduce the cost thereof. Furthermore, infrared transmissive glass includes toxic components such as As and Se, imposing counter-environmental problems. Therefore, the aforementioned materials are currently used only in limited applications such as for military usage, small optical components, carbon dioxide gas lasers and the like.

There has been intensive efforts to find and produce a material having high transmittance in the wide infrared region taking into account the issues of counter-environment and productivity. Particularly, ZnS has attracted a lot of research efforts since it does not include any toxic elements. Research and development of a sintered compact (polycrystal) along this line is in progress by means of hot pressing, eliminating the usage of toxic gas as the material in the production stage.

Japanese Patent Publication No. 41-412 discloses a method of fabricating a polycrystalline ZnS sintered compact having the theoretical density of 99–100% by means of hot pressing ZnS powder in vacuum or inert gas under the condition of 1.4–2.9 ton/cm$^2$ in pressure and 770–965° C. in temperature. This publication discloses that a sintered compact of various shapes such as in the form of a dome, a lens and the like is obtained by this method. It is noted that the transmittance of a sample of 1.6 mm in thickness thereof exhibited a high level value exceeding 60% in the wide infrared region of 2–6 $\mu$m.

Japanese Patent Laying-Open No. 50-2006 discloses a method of obtaining a light transmissive ZnS polycrystal by setting a forming piece of only ZnS powder or of mixture powder thereof with alkali metal halide in a mold and applying a hot press process under the condition of 50–500 kg/cm$^2$ in pressure and 600–1500° C. in temperature for at least 5 minutes. Example 1 thereof discloses the steps of placing a ZnS powder forming piece in a graphite pressurizer mold, hot pressing the same under the condition of not more than 10$^{-3}$ Torr in vacuum, 0.2 ton/cm$^2$ in pressure, and 1000° C. in temperature for 30 minutes, and polishing the plate to 50 mm in diameter and 3 mm in thickness. The light transmittance up to the wavelength of 2.5 $\mu$m of this plate is disclosed in FIG. 1 of this publication Japanese Patent Laying-Open No. 50-2006. It is appreciated from this FIG. 1 that the transmittance is 4–18% at the visible light region (wavelength 0.4–0.8 $\mu$m) and 19% at the wavelength of 2.5 $\mu$m in the near infrared region. It is therefore considered that a sample of 2 mm in thickness can exhibit higher light transmittance.

In pp. 2086–2092 of "Journal of the American Ceramic Society" Vol. 76, No. 8, a ZnS polycrystal is introduced obtained by using ZnS material powder having the grain size distribution width of 2–4 $\mu$m with the average grain size of 2 $\mu$m and 99.99% in purity and applying to the powder various uniaxial pressures (in Table 1 of this document, 137–207 MPa, i.e., 1.4–2.1 ton/cm$^2$) under vacuum of approximately 5×10$^{-2}$ Torr at 950° C. for 40–50 minutes in a uniaxial hot press apparatus of the graphite heater system. Eventually, a solidified ZnS polycrystal disc of 12.7 mm in diameter has the density of approximately 99.6–99.8% by the X-ray theoretical density according to Table 1 of the document. The infrared transmittance is approximately 40–70% for the infrared ray of 2.5–3 $\mu$m in wavelength according to FIG. 1 of that document.

FIG. 3 of the same document discloses the calculated values of the infrared transmittance for a sample disc of 2 mm in thickness under the assumption of various porosity levels from 0.01% to 1% with the pore of 0.3 $\mu$m in diameter. According to FIG. 3, light transmittance of the sample disc with the porosity of 0.5% is 0% for 2.5–3 $\mu$m in wavelength and approximately 40–60% for 8–10 $\mu$m wavelength. Under the assumption of 0.05% for the porosity, the light transmittance is approximately 15–25% at the wavelength of 2.5–3 $\mu$m and approximately 70% at the wavelength of 8–10 $\mu$m. This document discloses that the porosity must be less than 0.01% in order to use this type of polycrystalline zinc sulfide for a through-window of infrared rays from the calculated values. It is also mentioned that such a polycrystal of the same porosity level cannot be easily produced by the general sintering or hot press method.

Japanese Patent Publication No. 1-55213 discloses a polycrystalline ZnS sintered compact having the transmittance of at least 30% in the area of 3 mm in thickness at the infrared region of 1–14 $\mu$m in wavelength by hot pressing ZnS powder of high impurity with the grain size of not more than 5 $\mu$m in vacuum with the pressure of 0.8–1.4 ton/cm$^2$ and the temperature of 800–1050° C. Typical transmittance values of a polycrystalline ZnS sintered compact disclosed in this publication are shown in FIGS. 1 and 2. The sample of FIG. 1 has superior transmittance at the wavelength range of 8–12 μm. It is also appreciated that the sample of FIG. 2 is superior of transmittance at the wavelength range of 2.5–3 μm than that of FIG. 1.

The infrared sensor technology used in combination with the above conventional infrared optical components has seen significant progress these few years. The conventional infrared sensor uses the HgCdTe type material oriented to the wavelength range of 10 μm. It was necessary to cool down such a conventional infrared sensor to an operable low temperature using liquid nitrogen and the like. Recently, uncooled type infrared sensors have emerged adapting bolometer type detector, pyroelectric type detector, thermocouple type detector and the like.

These uncooled type infrared sensors have sensitivity for a wider wavelength range than that of the conventional cooled type sensor. For example, it is sensitive to rays of a wider wavelength range from visible light to infrared rays. Therefore, the uncooled type infrared sensor will sense and react to infrared rays of less than 5 μm in wavelength, to near-infrared rays of not more than 3 μm in wavelength, and also to visible light of 0.4–0.8 μm in wavelength, in addition to the infrared rays of 8–12 μm that is essentially required for body sensing. This sensitivity induces the problem of erroneous operation and sense precision error.

It is necessary to cut off light of the short wavelength region that is the cause of noise, particularly visible light, to solve this problem. This was impossible with the conventional optical component that exhibits constant transmittance at the aforementioned wide wavelength region. Therefore, measures such as providing a filter, for example, that cuts off the visible light have been taken. Since this will increase the cost, it is desirable to apply selective light transmittance to the optical component material per se serving as the window member and the like.

SUMMARY OF THE INVENTION

In view of the foregoing, the object of the present invention is to provide zinc sulfide (ZnS) that can be produced relatively economically without any toxic element, that reduces significantly the transmittance of visible light and infrared rays of not more than 3 μm in wavelength which become the noise for a uncooled type infrared sensor, that has high transmittance for infrared rays in the wavelength range of 8–12 μm, and that shields visible light, an optical component used in various infrared detector apparatuses, a method of fabricating the same, and an infrared detector apparatus including such an optical component.

An optical component according to an aspect of the present invention includes a zinc sulfide sintered compact. The light transmittance thereof when the thickness is 2 mm is not more than 3% at the wavelength range of visible light, not more than 20% at the wavelength range of 2.5–3 μm, and at least 30% and not more than 75% at the wavelength range of 8–12 μm.

Preferably, the optical component further includes an antireflection coating film formed on the surface of the zinc sulfide sintered compact. Light transmittance thereof when the thickness is 2 mm is at least 50% and not more than 90% at the wavelength range of 8–12 μm.

Preferably, the optical component has a porosity of at least 0.1% and not more than 1.0% for the zinc sulfide sintered compact.

Preferably, the optical component has a porosity of at least 0.1% and not more than 0.7% for the zinc sulfide sintered compact.

Preferably, the optical component has an average pore size of not more than 0.2 μm for the zinc sulfide sintered compact.

Preferably, the optical component has an average crystal grain size of at least 2 μm and not more than 50 μm for the zinc sulfide sintered compact.

Preferably, the optical component has an average crystal grain size of at least 2 μm and not more than 10 μm for the zinc sulfide sintered compact.

Preferably, the optical component includes a window member or a lens member.

An infrared application apparatus according to another aspect of the present invention includes an optical component of the above-described structure.

A zinc sulfide sintered compact according to a further aspect of the present invention has light transmittance of at least 0% and not more than 3% at the wavelength range of visible light, at least 0% and not more than 20% at the wavelength range of 2.5–3 μm, and at least 30% and not more than 75% at the wavelength range of 8–12 μm when the thickness is 2 mm.

Preferably, the porosity of the zinc sulfide sintered compact is at least 0.1% and not more than 1.0%.

Preferably, the average pore size of the zinc sulfide sintered compact is not more than 0.2 μm.

Preferably, the average crystal grain size of the zinc sulfide sintered compact is at least 2 μm and not more than 50 μm.

According to still another aspect of the present invention, a method of fabricating an optical component including a zinc sulfide sintered compact includes the steps of preparing zinc sulfide powder of at least 98% in purity, having an average grain size of at least 1 μm and not more than 2 μm, and hot compression molding the zinc sulfide powder in a non-oxidative atmosphere at the temperature of at least 900° C. and not more than 1000° C. and at the pressure of at least 150 kg/cm$^2$ and not more than 800 kg/cm$^2$ to obtain a zinc sulfide sintered compact.

Preferably, the method of fabricating an optical component further includes the step of optically polishing and finishing the surface of the zinc sulfide sintered compact.

Further preferably, the method of fabricating an optical component further includes the step of forming an antireflection coating film corresponding to the wavelength range of 8–12 μm wavelength on the surface of the optically polished zinc sulfide sintered compact.

According to a still further aspect of the present invention, a method of fabricating a zinc sulfide sintered compact includes the steps of preparing zinc sulfide powder of at least 98% in purity and having an average grain size of at least 1 μm and not more than 2 μm, and hot compression molding the zinc sulfide powder in a non-oxidative atmosphere at the temperature of at least 900° C. and not more than 1000° C. and at the pressure of at least 150 kg/cm$^2$ and not more than 800 kg/cm$^2$ to obtain a zinc sulfide sintered compact.

According to the present invention, a visible light shielding infrared optical component including a zinc sulfide sintered compact that can be produced relatively economically and without including any toxic element can be provided. The optical component exhibits superior infrared transmission at the wavelength range of 8–12 μm, and has extremely low transmittance of visible light and rays in the wavelength range of 2.5–3 μm, suitable as the window member or lens member of a uncooled type infrared sensor. The infrared optical component can achieve further favorable infrared transmittance by having an antireflection coating film corresponding to the wavelength range of 8–12 μm formed on the surface.

The usage of the optical component of the present invention as the window member and the lens member of a uncooled type infrared sensor provides the advantage of reducing noise caused by visible light and near-infrared rays by virtue of the visible light shielding ability. An infrared application apparatus reduced in structure complexity and cost can be provided, eliminating the need of an optical filter such as a bandpass filter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
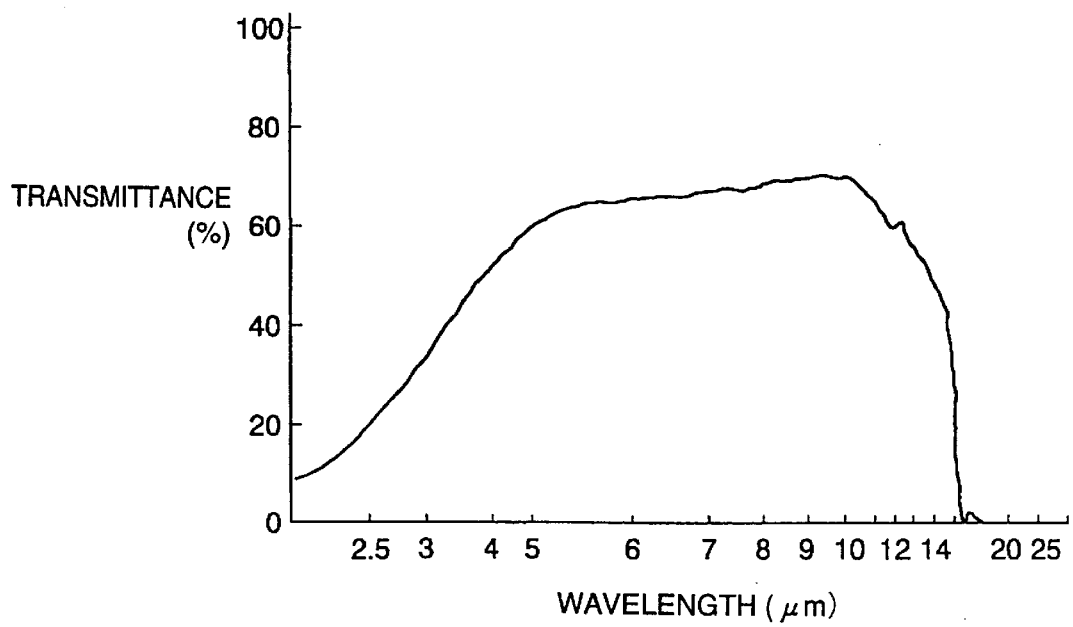
FIG. 1 is a graph representing the relationship between the wavelength and transmittance of a conventional representative infrared transmittive polycrystalline ZnS sintered compact.

An optical component of the present invention is formed of a polycrystalline zinc sulfide sintered compact superior in light transmittance at the wavelength range of 8–12 $\mu$m and significantly reduced in the transmittance of visible light and infrared rays of not more than 3 $\mu$m in wavelength that cause noise for a uncooled type infrared sensor.

The transmittance of the polycrystalline zinc sulfide optical component of the present invention has a transmittance of 0–3%, desirably not more than 1% for light in the visible light region (0.4–08 $\mu$m), and also 0–20%, desirably not more than 10% for near-infrared rays in the wavelength range of 2.5–3 $\mu$m, when the thickness is 2 mm. The transmittance at the wavelength range of 8–12 $\mu$m is as high as 30–75% when the surface is polished, and also 50–90%, desirably at least 70% when an antireflection coating film is formed on the surface. In the present invention, "transmittance" implies the linear transmittance measured by FTIR (Fourier Transformer Infrared) or a double beam type spectrophotometer.

The polycrystalline zinc sulfide sintered compact forming the optical component of the present invention desirably has a porosity of 0.1–1.0%. If, the porosity is less than 0.1%, the scattering effect of the visible light and the near-infrared region is low due to the small pore. There is a possibility that the transmittance will exceed 3% with the insufficient visible light shielding ability. If the porosity exceeds 1.0%, light scattering by the pore becomes great at the wide wavelength range. Therefore, the transmittance at the wavelength of 8–12 $\mu$m becomes less than 30% with no antireflection coating film, and less than 50% even with an antireflection coating film. The transmittance required for practical usage of an optical component cannot be obtained. The further preferable porosity range is 0.1–0.7%. The porosity is calculated by measurement of underwater weight and air weight, calculating the density by the Archimedian method, and comparing with the theoretical density (4.097 g/cm$^3$) by X-ray measurement.

The average pore size of the zinc sulfide sintered compact is desirably not more than 0.2 $\mu$m. If the average pore size exceeds 0.2 $\mu$m, the intensity of light scattering caused by the pore becomes so great at the wide wavelength range that the desired transmittance at 8–12 $\mu$m in wavelength cannot be obtained. The average pore size is calculated by reading respective pore sizes from the SEM (Scanning Electron Microscope) photograph of the fractured surface of the sintered compact and averaging respective values of the pore size.

The average crystal grain size of the polycrystalline zinc sulfide sintered compact is preferably in the range of 2–50 $\mu$m. If the average crystal grain size is less than 2 $\mu$m, the crystal grain boundary will become too great to result in excessive light scattering caused by the grain boundary. There is a possibility that the desired transmittance at the wavelength of 8–12 $\mu$m cannot be obtained. If the grain size exceeds 50 $\mu$m, the mechanical strength will be degraded by the coarse crystal. It cannot be used in the application of the window member and the like where strength is required. The further preferable average crystal grain size is within the range of 2–10 $\mu$m.

Figure 3:
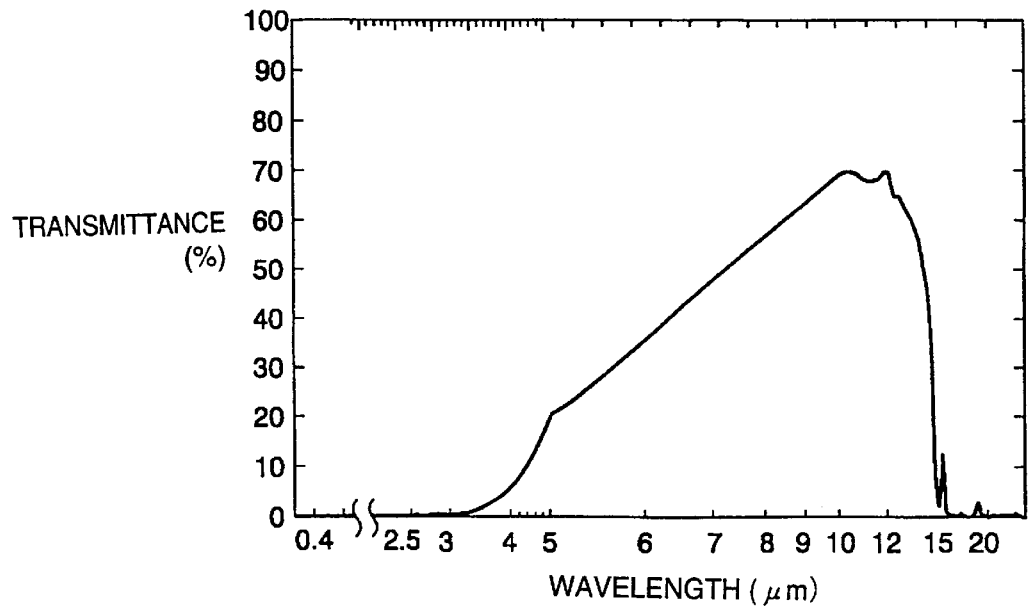
FIG. 3 is graph representing the relationship between the wavelength and transmittance of a polycrystalline ZnS sintered compact of the present invention that shields visible light.
Figure 4:
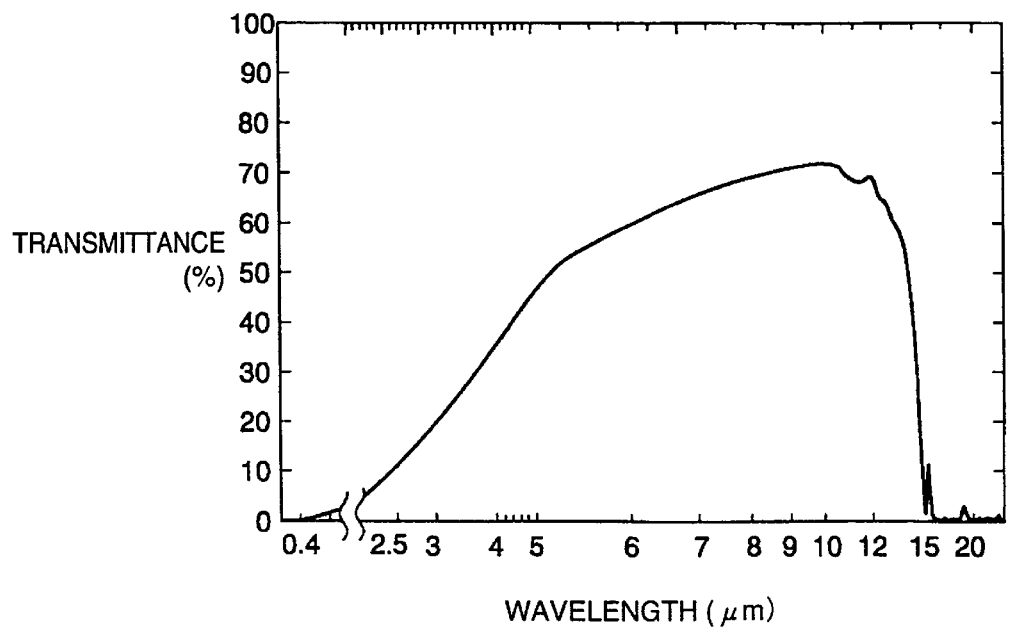
FIG. 4 is a graph representing the relationship between the wavelength and transmittance of another polycrystalline ZnS sintered compact of the present invention that shields visible light.
Figure 5:
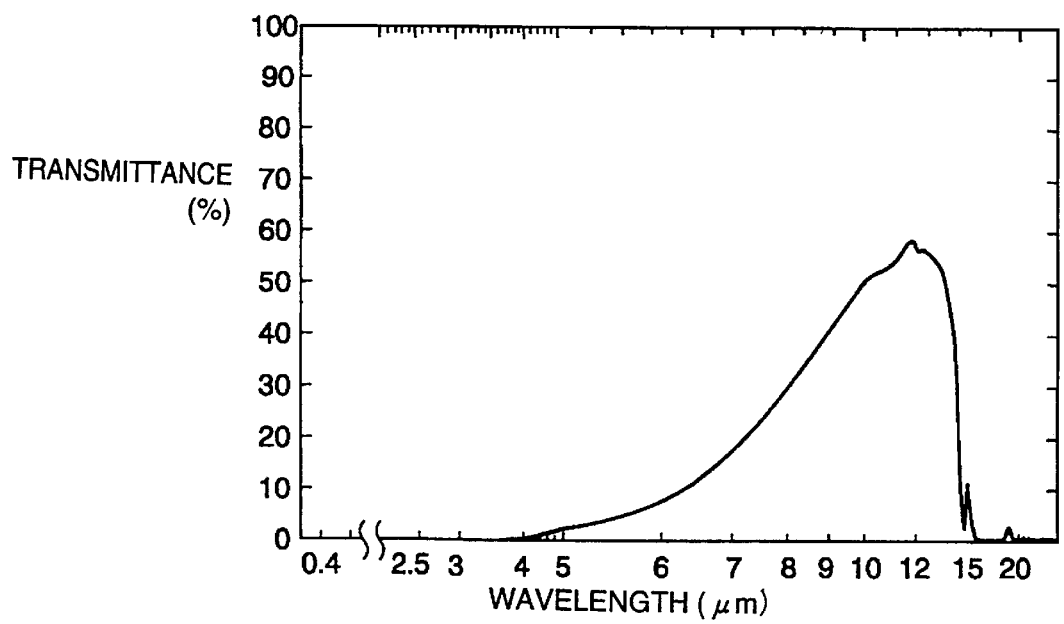
FIG. 5 is a graph representing the relationship between the wavelength and transmittance of still another polycrystalline ZnS sintered compact of the present invention that shields visible light.

Three typical polycrystalline zinc sulfide sintered compacts (thickness 2 mm) employed in the infrared optical component of the present invention have the transmittance of visible light and infrared rays shown in FIGS. 3–5. The following Table 1 summarizes the transmittance at respective wavelengths according to the data of FIGS. 3–5. Inventive materials 1–3 correspond to Samples 1–3 in respective examples that will be described afterwards.

Figure 2:
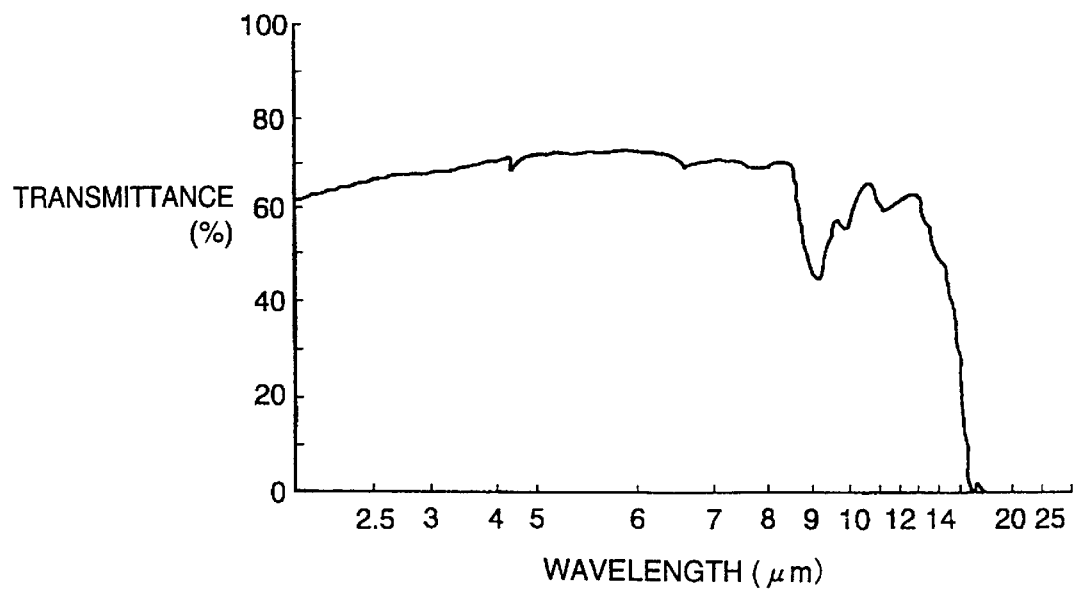
FIG. 2 is a graph representing the relationship between the wavelength and transmittance of another conventional infrared transmittive polycystalline ZnS sintered compact.

For the sake of comparison, the respective transmittance of conventional polycrystalline zinc sulfide sintered compacts are shown as conventional material 1 (FIG. 1 of Japanese Patent Publication No. 1-55213), conventional material 2 (FIG. 2 of the same publication), conventional material 3 (FIG. 1 of Japanese Patent Laying-Open No. 50-2006) and conventional material 4 (FIG. 1 of Journal of the American Ceramic Society, Vol. 76, No. 8) on the basis of the description in relative documents.

TABLE 1

Measured Wavelength (μm) and Transmittance (%)

| ZnS Sintered Compact (thickness) | Wavelength (μm) | | | | | |
|---|---|---|---|---|---|---|
| | 0.4 (μm) | 0.8 (μm) | 2.5 (μm) | 3.0 (μm) | 8.0 (μm) | 12.0 (μm) |
| Inventive Material 1 (2 mm) | 0 | 0 | 0 | 1 | 57 | 68 |
| Inventive Material 2 (2 mm) | 0 | 1 | 15 | 20 | 69 | 63 |
| Inventive Material 3 (2 mm) | 0 | 0 | 0 | 0 | 30 | 58 |
| Conventional Material 1 (3 mm) | Unknown | Unknown | 20 | 30 | 70 | 60 |
| Conventional Material 2 (3 mm) | Unknown | Unknown | 65 | 68 | 70 | 60 |
| Conventional Material 3 (3 mm) | 4 | 18 | 19 | Unknown | Unknown | Unknown |
| Conventional Material 4 (unknown) | Unknown | Unknown | 35 ~ 50 | 40 ~ 55 | 45 ~ 60 | 35 ~ 55 |

It is appreciated from Table 1 that the polycrystalline zinc sulfide sintered compact of the present invention has the transmittance of approximately 0 for visible light and significantly reduced transmission for near-infrared rays of 2.5–3 μm in wavelength. It is also appreciated that the transmittance of the infrared rays of 8–12 μm which is the required wavelength range has the sufficient level required for practical usage for an infrared sensor and the like. An antireflection coating film that prevents reflection centered about the wavelength range of 8–12 μm, if necessary, can be applied to further improve the transmittance at that wavelength range.

Figure 6:
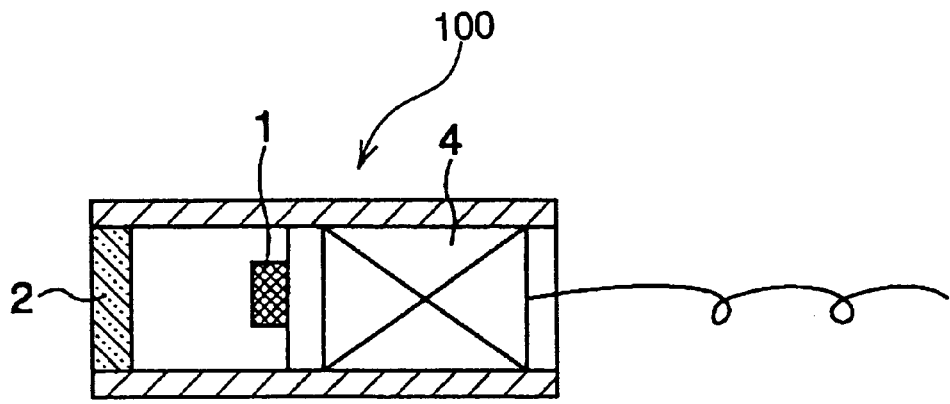
FIG. 6 is a schematic sectional view of an infrared uncooled sensor attached with a window member of a polycrystalline ZnS sintered compact of the present invention that shields visible light.
Figure 7:
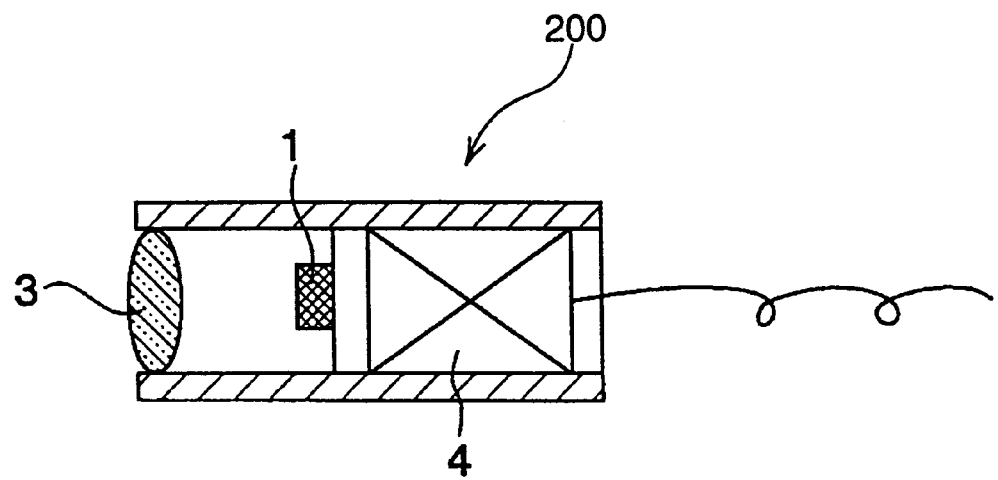
FIG. 7 is a schematic sectional view of an infrared uncooled sensor attached with a lens member of a polycrystalline ZnS sintered compact of the present invention that shields visible light.

By using the visible light shielding zinc sulfide sintered compact having selective light transmittance as the optical component of a window or lens member of an infrared application apparatus such as an infrared sensor, the provision of a bandpass filter that cuts off visible light can be omitted to allow reduction in the structure complexity and cost of the system. Uncooled type infrared detector apparatuses 100 and 200 using such a ZnS infrared optical component that shields visible light are shown in FIGS. 6 and 7, respectively. FIG. 6 corresponds to the case where a ZnS infrared optical component is used as a window member 2 in a uncooled type infrared sensor element 1. FIG. 7 corresponds to the case where the ZnS infrared optical component is used as a lens member 3. Infrared detector apparatuses 100 and 200 shown in FIGS. 6 and 7 include an electronic circuit portion 4.

A method of fabricating an optical component formed of a polycrystalline zinc sulfide sintered compact that shields visible light of the present invention will be described hereinafter. As ZnS material powder, powder having an average grain size of 1–2 μm and at least 98% in purity is used. It is difficult to adjust the transmittance of visible light with coarse powder having an average grain size (measured by Fsss (Fisher Sub-Sieve Sizer)) greater than 2 tem. Since sintering does not progress uniformly with coarse powder, there is a tendency of greater residual porosity. As a result, the desired infrared transmission cannot be obtained. ZnS powder that is smaller than 1 μm in average grain size cannot be produced easily. Also, the cost thereof will be increased.

The material of ZnS powder often includes moisture, sulfuric acid component, sulfur component and the like as impurity components in the stage of fabricating raw material powder. The total of these impurities is generally approximately 2% by weight. It has been found that these impurity components are vaporized and removed during the rise of temperature to 900° C. during the sintering process. By using raw material powder of at least 98% in purity, the resulting polycrystalline zinc sulfide sintered compact contains at least 99.9% ZnS by weight with the usage of no additives.

A polycrystalline zinc sulfide sintered compact is obtained by hot compression molding the ZnS material powder in a non-oxidative atmosphere according to the method of the present invention. As the non-oxidative atmosphere, vacuum or inert gas such as Ar (argon) is preferable. An oxidative atmosphere or in the atmosphere is not preferably since oxidation of ZnS occurs, whereby ZnO will be generated from the surface of the powder to adversely affect the light transmittance. Oxidation of ZnS does not easily occur in vacuum or in inert gas. Also, vaporization and removal of the aforementioned impurity components in the material powder are facilitated to allow favorable transmittance. High vacuum is not particularly required as the degree of vacuum. In general, approximately $10^{-2}$ Torr is sufficient obtained by the general rotary pump.

The appropriate temperature and pressure conditions for the hot compression molding process are 900–1000° C. and 150–800 kg/cm². If the sinteling temperature is below 900° C., sufficient sintering cannot be achieved, whereby the required infrared transmittance cannot be obtained. Since deformation of the powder is insufficient when the temperature is below 900° C., compactness cannot be achieved and residual porosity will become excessive. Accordingly, the transmittance will be degraded by light scattering. If the sintering temperature exceeds 1000° C., sublimation from the ZnS powder itself becomes so intensive that the yield is degraded. Also, the sinter furnace, the vacuum system apparatus, and the like will be easily damaged. Furthermore, the crystal grain size of the ZnS sintered compact will grow to be greater than 50 μm. The mechanical strength of the sintered compact would be degraded to limit its usage as an optical component.

If the pressure is below 150 kg/cm², sufficient sintering cannot be achieved likewise the case where the temperature is below 900° C. As a result, the necessary infrared transmission cannot be achieved. If the pressure becomes higher than 800 kg/cm$^2$, the residual porosity will become so small that the transmittance of visible light and of infrared rays at 2.5–3 μm increases to become equivalent to that of the conventional zinc sulfide sintered compact. This means that the desired shielding ability of visible light of the present invention cannot be achieved. The period of time of maintaining the pressure is 0.5–1.0 hours in average. The time is adjusted together with the combination of the temperature and pressure conditions to obtain the required shielding performance of visible light.

Although it is not required to particularly restrict the material of the mold for the hot compression molding, an alumina ceramic mold that is inferior to anti-thermal shock is not preferred. A mold of the carbon type material such as graphite, C/C composite and the like is appropriate according to the range of the conditions of the present invention. Although uniaxial pressure can be applied for the hot compression molding, HIP (Hot Isostatic Pressing) using gas can provide substantially similar effects.

The polycrystalline zinc sulfide sintered compact obtained by the above-described hot compression molding has a porosity in the range of 0.1–1.0% when the theoretical density of ZnS is calculated as 4.097 g/cm$^3$. By controlling the residual porosity, the light transmittance and the effect on scattering can be controlled. Particularly, by setting the porosity to 0.1–1.0%, light scattering of the short wavelength is promoted to allow visible light in the range of 0.4–0.8 μm in wavelength to be shielded and the transmittance of near-infrared rays of 2.5–3 μm in wavelength to be reduced.

Figure 8:
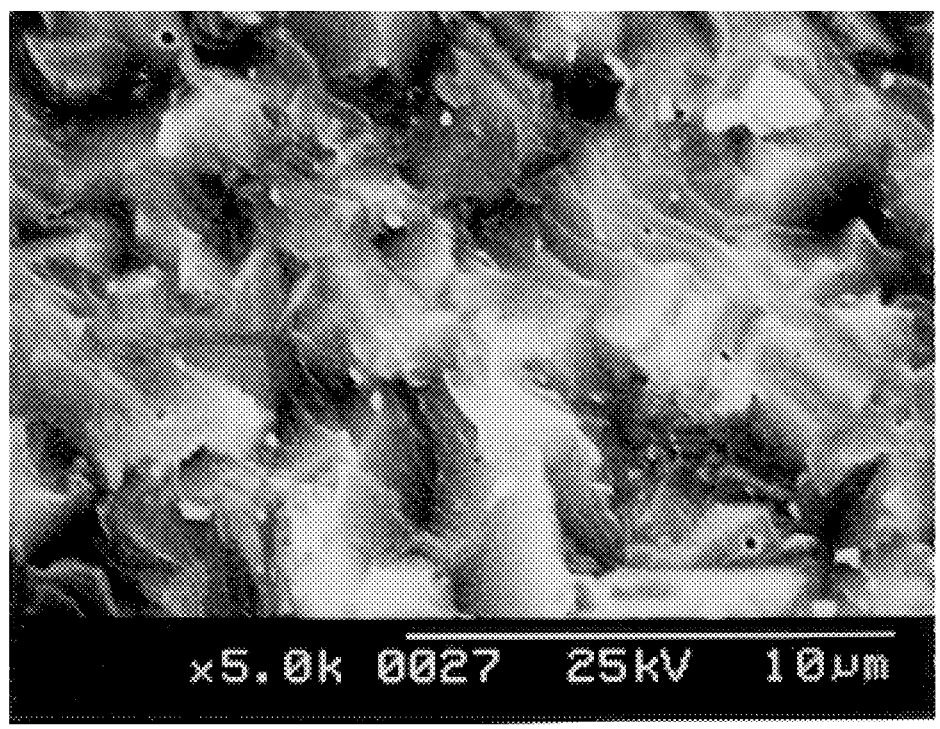
FIG. 8 is a SEM photograph of a typical fractured surface of a polycrystalline ZnS sintered compact of the present invention that shields visible light.

A SEM photograph of a fractured surface of the visible light shielding polycrystalline zinc sulfide sintered compact with an appropriate porosity is shown in FIG. 8. It is appreciated that the average crystal grain size is approximately 2–3 μm and the diameter of the black pore therein is approximately 0.2–0.1 μm for the sintered compact. It was found that the average crystal grain size may grow to approximately 50 μm at the above-described high temperature side of the sintering condition.

EXAMPLE

ZnS powder of 99.8% in purity and having an average grain size of 1.2 μm, 1.5 μm and 2 μm measured by Fisher sub-sieve sizer as the material powder were prepared. Each ZnS powder was introduced into a graphite-made or C/C composite-made hot compression mold having an inner diameter of 80 mm. Two types of the sintering atmosphere were selected, i.e., increasing the temperature in the atmosphere of 10$^{-2}$ Torr in vacuum and introducing Ar gas at 900° C., and sintering in vacuum. Then, sintering by the hot compression molding under the sintering conditions shown in the following Table 2 was carried out.

TABLE 2

| Sample | ZnS Powder Grain Size (μm) | Sintering Condition | | | Hot Compression Molding | |
|---|---|---|---|---|---|---|
| | | Temperature (° C.) | Pressure (kg/cm$^2$) | Time (hr) | Atmosphere | Mold Material |
| 1 | 1.2 | 950 | 300 | 0.5 | Ar gas | Graphite |
| 2 | 1.5 | 950 | 350 | 0.5 | Ar Gas | Graphite |
| 3 | 1.5 | 900 | 300 | 1.0 | Vacuum | Graphite |
| 4 | 2.0 | 900 | 400 | 1.0 | Vacuum | Graphite |
| 5 | 2.0 | 950 | 500 | 0.5 | Ar gas | C/C Composite |
| 6 | 1.5 | 925 | 250 | 1.0 | Vacuum | Graphite |
| 7 | 1.5 | 975 | 400 | 0.75 | Ar Gas | Graphite |
| 8 | 2.0 | 925 | 600 | 1.5 | Vacuum | C/C Composite |

Each obtained polycrystalline ZnS sintered compact was cut into a predetermined shape by a cutting process and the like and then ground. Using alumina powder of 0.5 μm in grain size, both surfaces of each compact were optically polished as respective optical components. The transmittance of infrared rays was measured using FTIR (Fourier Transform Infrared) measurement device for each sample (thickness 2 mm) of the optical component. Also, the transmittance of visible light was measured using a double beam visible ultraviolet spectrophotometer. The transmittance at the wavelengths of 0.4 μm, 0.8 μm, 2.5 μm, 3 μm, 8 μm and 12 μm is shown in the following Table 3 for each sample. The porosity was calculated by measuring the specific gravity by the underwater method and shown together in Table 3.

TABLE 3

| Sample (2 mm) | Measured Wavelength (μm) and Transmittance (%) | | | | | | Porosity (%) |
|---|---|---|---|---|---|---|---|
| | 0.4 (μm) | 0.8 (μm) | 2.5 (μm) | 3.0 (μm) | 8.0 (μm) | 12.0 (μm) | |
| 1 | 0 | 0 | 0 | 1 | 57 | 68 | 0.65 |
| 2 | 0 | 1 | 15 | 20 | 69 | 63 | 0.17 |
| 3 | 0 | 0 | 0 | 0 | 30 | 58 | 0.82 |
| 4 | 0 | 0 | 0 | 2 | 54 | 70 | 0.53 |
| 5 | 0 | 0 | 2 | 10 | 15 | 65 | 69 | 0.24 |
| 6 | 0 | 0 | 0 | 0 | 41 | 62 | 0.72 |
| 7 | 0 | 0 | 5 | 10 | 68 | 70 | 0.43 |
| 8 | 0 | 1 | 7 | 15 | 70 | 70 | 0.31 |

The observed result by the SEM of the fractured surface of Sample 1 is shown in FIG. 8. The pore size was 0.1–0.2 μm and the average crystal grain size was 2–3 μm. Although the pore size was substantially equal for other samples, there were some that had the average crystal grain size of several 10 μm was seen by the sintering temperature of 975° C.

Then, a multilayer antireflection coating film of MgF$_2$, YF$_3$, CeF$_3$ and Al$_2$O$_3$ was formed on the surface of the optical component of each polycrystalline ZnS sintered compact to result in the total film thickness of 2 μm. The infrared transmittance was measured as described above for each obtained sample of the optical component. All the samples exhibited high transmittance of at least approximately 60% at the wavelength of 10 μm. It was found to be most appropriate as the window member for a uncooled type infrared sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical component including a zinc sulfide sintered compact, having light transmittance of not more than 3% at a wavelength range of visible light, not more than 20% at a wavelength range of 2.5–3 μm, and at least 30% and not more than 75% at a wavelength range of 8–12 μm, at a thickness of said zinc sulfide sintered compact of 2mm.

2. The optical component according to claim 1, further comprising an antireflection coating film formed on a surface of said zinc sulfide sintered compact, having light transmittance of at least 50% and not more than 90% at a wavelength range of 8–12 μm at a thickness of said zinc sulfide sintered compact of 2 mm.

3. The optical component according to claim 1, wherein said zinc sulfide sintered compact has a porosity of at least 0.1% and not more than 1.0%.

4. The optical component according to claim 1, wherein said zinc sulfide sintered compact has a porosity of at least 0.1% and not more than 0.7%.

5. The optical component according to claim 1, wherein said zinc sulfide sintered compact has an average pore size of not more than 0.2 μm.

6. The optical component according to claim 1, wherein said zinc sulfide sintered compact has an average crystal grain size of at least 2 μm and not more than 50 μm.

7. The optical component according to claim 1, wherein said zinc sulfide sintered compact has an average crystal grain size of at least 2 μm and not more than 10 μm.

8. The optical component according to claim 1, said optical component including a window member.

9. The optical component according to claim 1, said optical component including a lens member.

10. An infrared application apparatus including an optical component, said optical component comprising a zinc sulfide sintered compact, having light transmittance of not more than 3% at a wavelength region of visible light, not more than 20% at a wavelength region of 2.5–3 μm, and at least 30% and not more than 75% at a wavelength region of 8–12 μm, at a thickness of said zinc sulfide sintered compact of 2 mm.

11. The infrared application apparatus according to claim 10, said optical component including a window member.

12. The infrared application apparatus according to claim 10, said optical component including a lens member.

13. A zinc sulfide sintered compact having light transmittance of not more than 3% at a wavelength region of visible light, not more than 20% at a wavelength region of 2.5–3 μm, and at least 30% and not more than 75% at a wavelength region of 8–12 μm, at a thickness of said zinc sulfide sintered compact of 2 mm.

14. The zinc sulfide sintered compact according to claim 13, having a porosity of at least 0.1% and not more than 1.0%.

15. The zinc sulfide sintered compact according to claim 13, having an average pore size of not more than 0.2 μm.

16. The zinc sulfide sintered compact according to claim 13, having an average crystal grain size of at least 2 μm and not more than 50 μm.

* * * * *